United States Patent
Lim et al.

(10) Patent No.: US 7,787,265 B2
(45) Date of Patent: Aug. 31, 2010

(54) SELF-COUPLED DRIVER USED IN DUAL-SWITCH FORWARD POWER CONVERTER

(75) Inventors: Sun Huat Lim, Melaka (MY); Teo Chye Phua, Singapore (SG); Binbin Zhang, Singapore (SG)

(73) Assignee: Speedy-Tech Electronics Ltd., Singapore (SG)

( * ) Notice: Subject to any disclaimer, the term of this patent is extended or adjusted under 35 U.S.C. 154(b) by 0 days.

(21) Appl. No.: 11/995,200

(22) PCT Filed: Feb. 27, 2007

(86) PCT No.: PCT/SG2007/000056
§ 371 (c)(1),
(2), (4) Date: Jan. 9, 2008

(87) PCT Pub. No.: WO2008/105741
PCT Pub. Date: Sep. 4, 2008

(65) Prior Publication Data
US 2010/0110733 A1    May 6, 2010

(51) Int. Cl.
*H02M 3/335* (2006.01)
(52) U.S. Cl. .......................... 363/22; 363/26

(58) Field of Classification Search ................ 363/18, 363/19, 20, 21.01, 21.04, 22, 23, 24, 25, 363/26
See application file for complete search history.

(56) References Cited

U.S. PATENT DOCUMENTS

| 4,344,122 A | * | 8/1982 | Jones | 363/23 |
| 5,162,981 A | * | 11/1992 | Lazar et al. | 363/22 |
| 6,917,528 B2 | * | 7/2005 | Abe | 363/22 |

* cited by examiner

*Primary Examiner*—Adolf Berhane
(74) *Attorney, Agent, or Firm*—Pyprus pte Ltd

(57) ABSTRACT

A dual-switch forward power converter, and a method of operating the same, employs a self-coupled driver to achieve among other advantages higher efficiency, lower part count and component cost. In one aspect of the present invention, a power converter comprises a transformer and two switching transistors, and said transformer has two serially-connected primary windings with the first winding connected to a first switching transistor which is biased by a pulse controller, and the second winding couples the voltage across said first winding to bias the second switching transistor. In addition, the circuit on the primary side of said transformer further comprises means of dissipating magnetization current and the circuit on the secondary side comprises a rectifier and a low-pass filter.

24 Claims, 2 Drawing Sheets

SELF-COUPLED DRIVER USED IN DUAL-SWITCH FORWARD POWER CONVERTER

The present application is a national stage entry of PCT/SG2007/000056 filed Feb. 27, 2007.

FIELD OF THE INVENTION

The present invention relates to a switch mode power supply, and more particularly to a dual-switch forward converter employing a self-coupled driver to achieve among other advantages higher efficiency, lower part count and component cost.

BACKGROUND OF THE INVENTION

Switch mode power supplies have been widely used in a great variety of applications and appliances which require light and compact regulated power sources of high efficiency. In addition, said power supplies have high reliability and low power loss, and they can easily be configured to step up and down supply voltages in accordance with design requirements.

In a switch mode power supply, power regulation is accomplished by applying pulse-width modulation to the switching transistors, in particular, the control of the on-time to off-time ratio of said transistors which operate at frequencies up to hundreds of kilo-hertz. The output voltage depends on the duty cycle of said control pulses and the input voltage, and it is essentially load independent. Moreover, changing the switching pulse width accordingly results in constant output voltage even when the input voltage varies.

A plurality of power converter topologies has been devised to address the different design issues such as power level, output voltage and input-output isolation. Flyback converters, for instance, require relatively large transformer cores and switching transistors, and they are suitable for applications which require low part count and low power levels. In the popular forward topology, energy is supplied to the output capacitor while the switching transistor is conducting, and it achieves significantly better transformer utilization than the flyback design. However, forward converters employing single switching transistor suffer from the same shortcoming as the flyback design, namely the voltage across said transistor is inherently unconstrained. This results in higher voltage rating requirement for the switching transistor, and large voltage transients which must be clamped by snubber circuit or additional reset winding. The undesirable power loss in said snubber circuit results in lower power conversion efficiency.

As illustrated in FIG. 1, a two-switch forward converter typically employs two switching transistors 406 & 407 on the primary side of transformer 102. Magnetizing current builds up during the conducting periods. When said transistors turn off and interrupt the current path, the magnetizing inductance acts as a voltage source. Reverse voltage from this inductive source forward biases and turns on the two diodes 403 & 404 to maintain current flow. In sufficient time, the magnetizing inductance is depleted by this voltage until the stored energy is returned to input source 401. Its clamped transformer voltage operation, with a maximum duty cycle of 50%, allows easy reset of transformer core. Thus, the voltage across said switching transistors is constrained to the input voltage and this allows lower-voltage and less expensive switching transistors to be used.

The conventional two-switch forward configuration has one known disadvantage, namely an isolated driver circuit 101 is required to couple pulses from controller 402 to transistor 407. Said drive circuit is commonly implemented with additional driver transformer or active semiconductor isolation device, typically together with external components, at the expense of increased bill-of-material cost, power consumption, part count, and overall circuit board estate.

Accordingly, there is an imperative need for innovative gate drive circuit designs which could meet the increasing demand for high-efficiency, low-cost and compact switch mode power supplies. The power converter of the present invention satisfies the need. Other advantages of this invention are apparent with reference to the detailed description provided herewith.

SUMMARY OF THE INVENTION

In accordance with an aspect of the present invention, a power converter comprises a transformer and two switching transistors. Said transformer has two serially-connected primary windings with the first winding connected to a first switching transistor which is biased by a pulse controller, and the second winding couples the voltage across said first winding to bias the second switching transistor. Thus, the power converter of the present invention does not require a stand-alone isolation driver typically used to couple pulses generated by said controller to one of the switching transistors. In particular, said transformer couples input energy to an output capacitor when both of said switches are conducting. In addition, the circuit on the primary side of said transformer further comprises means of dissipating magnetization current and the circuit on the secondary side comprises a rectifier and a low-pass filter.

In another aspect, the present invention provides a method of operating a power converter comprising the steps of coupling an input voltage to said first primary winding and periodically biasing said switching transistors by said controller and a self-coupled driver implemented with said second primary winding of said transformer; and deriving an output from an output capacitor of said low-pass filter in said circuit on the secondary side of said transformer.

BRIEF DESCRIPTION OF THE DRAWINGS

Preferred embodiments according to the present invention will now be described with reference to the Figures, in which like reference numerals denote like elements.

DETAILED DESCRIPTION OF THE INVENTION

The present invention may be understood more readily by reference to the following detailed description of certain embodiments of the invention.

Figure 1:
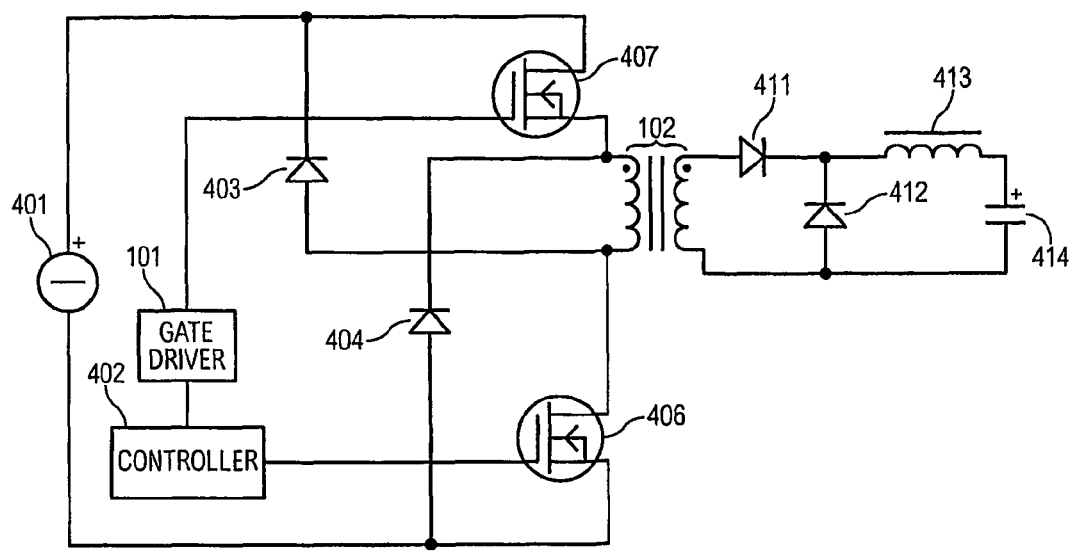
FIG. 1 illustrates the schematic diagram of a typical two-switch forward converter (prior art).
Figure 2:
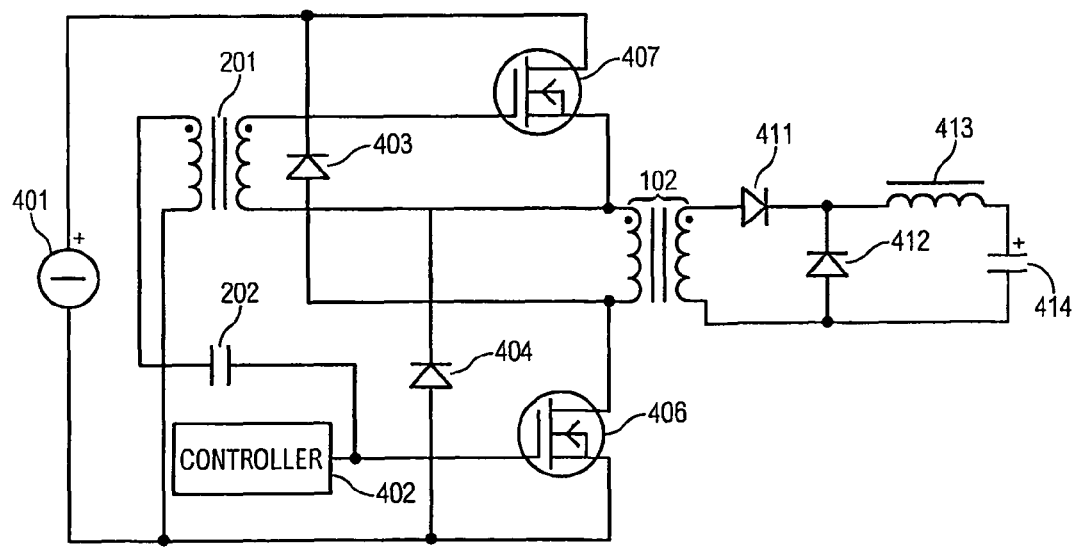
FIG. 2 shows the schematic diagram of a dual-switch forward converter using an isolated transformer-based gate driver.

One solution to said challenge of designing cost-effective forward converters is to use transformer-based gate driver circuit 201 & 202 as shown in FIG. 2 instead of using the relatively costly semiconductor isolation driver circuit 101 in FIG. 1. Upper switching transistor 407 is connected between the high voltage bus of input source 401 and the primary winding of transformer 102, whereas its gate terminal is coupled to the secondary winding of a second transformer 201 which has the first end of its primary winding coupled by capacitor 202 to the output of controller 402. The second end of said primary winding is connected to the 0V or ground return bus of input source 401. The voltage level (with respect to 0V) at the source of transistor 407 is not constant. When transistor 407 is conducting, said voltage level is almost equal to the input voltage 401. On the other hand when transistor 407 is not conducting, said voltage will drop to a level that almost equals to 0V or the voltage of the ground return bus of input source 401, and this voltage starts to rise when the energy in the core is fully dissipated. As a result, said transformer 201 serves as an inductive coupling device between controller 402 and gate-to-source input of transistor 407 which have different voltage references.

Figure 3:
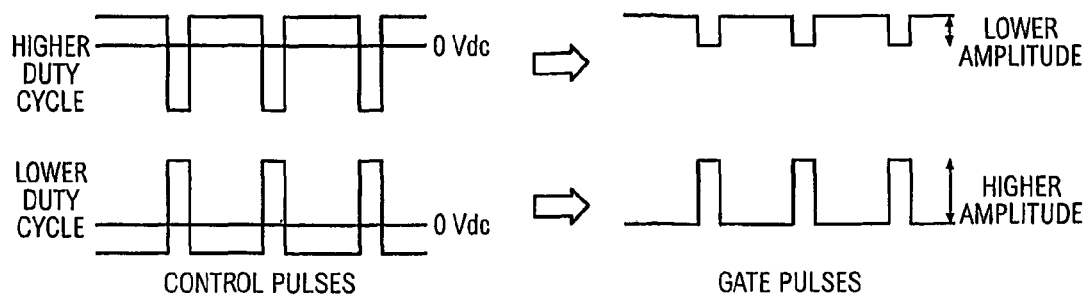
FIG. 3 shows the typical waveforms of control and gate pulses for transformer-based gate drivers.

In spite of its advantage, the above transformer-based approach may not be suitable for applications with tight constraints on component footprint due to the considerable size of transformer 201. In addition, gate driver transformer 201 couples the effective load of the switching transistors and other components to the output of controller 402, thus drawing additional current from said controller. Finally, the amplitude of the gate pulses coupled to transistor 407 is inversely proportional to the duty cycle of the control pulses generated by controller 402. This relationship, which is illustrated in the waveform diagrams in FIG. 3, poses another limitation to the maximum duty cycle of the pulses which controller 402 can generate without excessively driving down the amplitude of the gate pulses delivered to transistor 407, which fails to turn on when said pulse amplitude is lower than the cut-off threshold of said transistor. Coupling capacitor 202 must have large enough capacitance, otherwise it would round-off pulses generated by controller 402 and those coupled to the gate of transistor 407, which further limits the duration of the turn-on time or the maximum duty cycle of control pulses.

Figure 4:
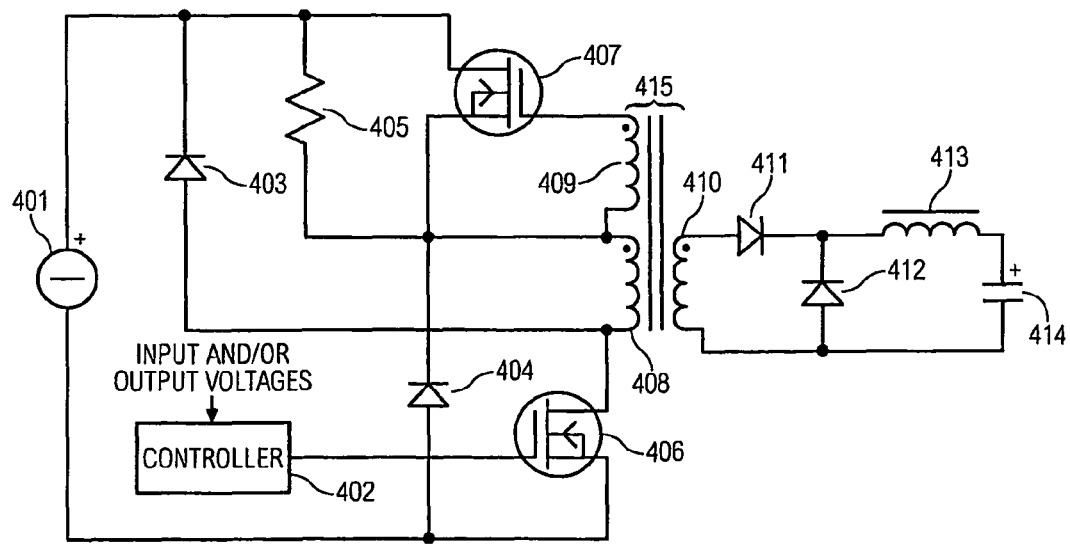
FIG. 4 depicts the schematic diagram of the dual-switch forward converter of the present invention.

The present invention provides a dual-switch forward power converter using an efficient yet simple self-coupled driver configuration in the primary side of the converter circuitry. Said self-coupled driver does not require any semiconductor device or stand-alone transformer as the isolation driver circuit 101, 201 & 202 (refer to FIGS. 1 & 2). FIG. 4 illustrates the schematic diagram of said dual-switch forward converter having self-coupled driver. Controller 402 generates periodic pulses alternating between a predetermined high voltage and a predetermined low voltage at a duty cycle which is predetermined or variable in accordance with the predetermined or detected magnitudes of input voltage 401 and/or the output voltage across capacitor 414, and said alternating voltage levels are capable of turning on and off the switches used in the forward converter. Although the description of the switches used in the present invention is referenced to a type of field effect transistors, it is apparent to those skilled in the art that said switches can be implemented with a variety of devices including but not restricted to field-effect transistors (FETs), metal-Oxide semiconductor field-effect transistors (MOSFETs), insulated gate bipolar transistors (IGBTs) and bipolar junction transistors (BJTs).

In FIG. 4, controller 402 is connected to the gate terminal of first switching transistor 406. The source of said transistor is tied to the 0V return bus of input source 401. Second switching transistor 407 has its drain terminal connected to the high voltage power bus of said input source 401. Transformer 415 comprises two sets of primary winding 408 and 409 having $N_{p1}$ and $N_{p2}$ number of turns respectively. First set of primary winding 408 has two of its ends connected respectively to the drain of said first transistor 406 and the source of said second transistor. Second primary winding 409 has two of its ends connected respectively to the gate and source terminals of said second transistor 407. A first magnetization current path is formed by first diode 403 with its cathode and anode connected respectively to the high power bus of said input source 401 and the drain of said first transistor 406, and a second current path is formed by second diode 404 with its cathode and anode connected respectively to the source of said second transistor 407 and said 0V power bus of said input source 401. A resistor 405 is connected across the drain and source terminals of said second transistor 407. Finally, secondary winding 410 of transformer 415 having $N_s$ number of turns is connected to a rectifying circuit comprising a third diode 411 in series with inductor 413 and capacitor 414. Second end of said secondary winding 410 is connected to the anode of a fourth diode 412 whose cathode is tied together with the cathode of said third diode 411. An output voltage source is derived across said capacitor 414.

Referring again to FIG. 4, controller 402 outputs a continuous stream of pulses of pre-determined amplitude and duty cycle to turn on and off first switching transistor 406 alternately. No isolation driver circuit is required between said controller 402 and second switching transistor 407. When said first transistor 406 is conducting, resistor 405 provides a path for a very small amount of current to first transformer primary winding 408. The voltage across said first primary winding ($V_{Np1}$) almost equals to the voltage $V_{in}$ of input source 401: $V_{Np1} \approx V_{in}$. The voltage across second primary winding 409 is proportional to that across said first primary winding 408: $V_{Np2} = nV_{Np1}$ with n denoting the turn ratio $N_{p2}/N_{p1}$. Turn ratio is chosen such that $V_{Np2}$ is sufficiently large to turn on said second transistor 407 (when said first transistor 406 is conducting), which has, at this stage, a much lower drain-source resistance than resistor 405. Thus, said second primary winding 409 draws almost all its current flow through said second switching transistor 407. When said first switching transistor 406 is not conducting, the magnetization current of transformer 415 flows through first and second diodes 403 & 404 and back to said input source 401. At this stage, the voltage across said first primary winding 408 is very close to that of input source 401, but with the polarity reversed: $V_{Np1} \approx -V_{in}$. The voltage across said second primary winding 409 is therefore $V_{Np2} = -nV_{Np1}$. Thus, said second switching transistor 407 is reverse-biased and it stops conducting. Accordingly, both switching transistors 406 & 407 in the dual-switch forward power converter of the present invention are capable of being turned on and off simultaneously. The voltage across fourth diode 412 is a pulse-width-modulated voltage which jumps between $nV_{Np1}$ and a level close to 0V. The low-pass filter formed by inductor 413 and output capacitor 414 produces an average value from said voltage across said fourth diode 412. The output voltage depends on the duty cycle of the control pulses and the input voltage, and it is essentially load independent.

The choice of components affects the overall conversion efficiency of any switch mode power supplies including said dual-switch forward converter of the present invention. Switching transistors must have low resistance during conducting cycles and should meet the required bandwidth, voltage and current ratings with safety margin. Suitable transistor types include but not restricted to FET, MOSFET, IGBT and BJT. When bipolar transistors are used to replace FETs as the switches, the base, emitter and collector terminals of the bipolar transistors replace respectively the gate, source and drain terminals of the corresponding FETs. Diodes should preferably have low on-resistance, low forward voltage drop and they should meet the required forward and breakdown voltage and current requirements. Higher switching frequency allows smaller size of the inductor to be used, at the expense of higher switching losses of the switching transistors.

It is evident to those skilled in the art that the dual-switch forward converter of the present invention provides many advantages over the widely used designs employing isolation driver circuit. Firstly, the additional second primary winding 409 is inexpensive and secondly it does not take up additional circuit board estate; thirdly, the power dissipated in said winding and resistor 405 is insignificant compared to the typical power consumption of a semiconductor isolator chip; and that an isolation driver circuit, whether it is active or passive, adds additional load to said pulse controller. Finally, compared to forward converters employing transformer-based drive circuits, the self-coupled driver of the present invention does not pose additional limitation on the maximum duty cycle of the control pulses.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

What is claimed is:

1. A power converter comprising:
    a transformer having first and second serially-connected primary windings both wound in the same direction and a secondary winding, with the second end of said second primary winding connected to the first end of said first primary winding;
    a primary circuit for coupling an input voltage generated by an input source to said first primary winding and including first and second switches periodically biased conducting for coupling said input voltage to said first primary winding, with said first switch biased by a periodic pulse waveform generated from a controller capable of pulsewidth modulation, and said second switch biased by voltage induced across said second primary winding through magnetic coupling of voltage across said first primary winding; and first and second magnetization current paths being tapped respectively from said first and second ends of said first primary winding to return magnetization current to said input source only when said switches are biased non-conducting; and
    a secondary circuit for coupling the voltage induced across said secondary winding to an output and including a rectifier and a low-pass filter.

2. The power converter of claim 1 wherein said first magnetization current path in said primary circuit is a first diode having the cathode connected to said first end of said first primary winding and the anode connected to the zero-volt or ground return of said input source.

3. The power converter of claim 1 wherein said second magnetization current path in said primary circuit is a second diode having the anode connected to said second end of said first primary winding and the cathode connected to the high-voltage or positive terminal of said input source.

4. The power converter of claim 1 wherein said controller generates periodic pulses alternating between a predetermined high voltage and a predetermined low voltage at a duty cycle which is predetermined or variable in accordance with the predetermined or detected magnitudes of said input voltage and/or the output voltage across said low-pass filter of said secondary circuit, and said alternating voltage levels are capable of turning on and off said switches.

5. The power converter of claim 1 wherein said first and second switches in said primary circuit are field effect transistors (FETs) including metal-oxide semiconductor field effect transistors (MOSFETs), with low drain-to-source resistance when said FETs are fully forward-biased.

6. The power converter of claim 5 wherein said first FET having the drain and source terminals connected to said second end of said first primary winding and zero-volt or ground terminal of said input source respectively, and the gate terminal connected to the output of said controller capable of pulse-width modulation.

7. The power converter of claim 5 wherein said second FET having the gate and source terminals connected to said first and second ends of said second primary winding respectively, and the drain terminal connected to the high-voltage or positive terminal of said input source; and a resistor being connected across said drain and source terminals for allowing a small amount of current to flow from said input source into said first primary winding at the onset of each conducting cycle of said first FET, with the resultant voltage induced across said second primary winding forward-biasing said second FET to conduct.

8. The power converter of claim 1 wherein said first and second switches in said primary circuit are bipolar transistors including Insulated Gate Bipolar Transistors (IGBTs) and bipolar junction transistors (BJTs) with low emitter-collector resistance when said transistors are fully forward-biased.

9. The power converter of claim 8 wherein said first bipolar transistor having the emitter and collector terminals connected to said second end of said first primary winding and zero-volt or ground terminal of said input source respectively, and the base terminal connected to the output of said controller capable of pulse-width modulation.

10. The power converter of claim 8 wherein said second bipolar transistor having the base and emitter terminals connected to said first and second ends of said second primary winding respectively, and the collector terminal connected to the high-voltage or positive terminal of said input source; and a resistor being connected across said collector and emitter terminals for allowing a small amount of current to flow from said input emitter into said first primary winding at the onset of each conducting cycles of said first bipolar transistor, with the resultant voltage induced across said second primary winding forwardbiasing said second bipolar transistor to conduct.

11. The power converter of claim 1 wherein said rectifier in said secondary circuit comprising a third and forth diodes having the anodes connected to a first and second ends of said secondary winding respectively, and with their cathodes connected to each other.

12. The power converter of claim 1 wherein said low pass filter in said secondary circuit comprising an inductor connected in series with a capacitor, and said filter being connected in parallel with said rectifier, and the output voltage being voltage across said capacitor.

13. A method of operating a power converter, comprising the steps of:
    providing a transformer having first and second serially-connected primary windings both wound in the same direction and a secondary winding, with the second end of said second primary winding connected to the first end of said first primary winding;
    coupling an input voltage generated by an input source to said first primary winding via a primary circuit comprising first and second switches periodically biased conducting for coupling said input voltage to said first primary winding, with said first switch biased by a periodic pulse waveform generated from a controller capable of pulsewidth modulation, and said second switch biased by voltage induced across said second primary winding through magnetic coupling of the voltage across said first primary winding; and first and second magnetization current paths being tapped respectively from said first and second ends of said first primary winding to return magnetization current to said input source only when said switches are biased non-conducting; and coupling the voltage induced across said secondary winding to an output via a secondary circuit comprising a rectifier and a low-pass filter.

14. The method of claim 13 wherein said first magnetization current path in said primary circuit is a first diode having the cathode connected to said first end of said first primary winding and the anode connected to the zero-volt or ground return of said input source.

15. The method of claim 13 wherein said second magnetization current path in said primary circuit is a second diode having the anode connected to said second end of said first primary winding and the cathode connected to the high-voltage or positive terminal of said input source.

16. The method of claim 13 wherein said controller generates periodic pulses alternating between a predetermined high voltage and a predetermined low voltage at a duty cycle which is predetermined or variable in accordance with the predetermined or detected magnitudes of said input voltage and / or the output voltage across said low-pass filter of said secondary circuit, and said alternating voltage levels are capable of turning on and off said switches.

17. The method of claim 13 wherein said first and second switches in said primary circuit are field effect transistors (FETs) including metal-oxide semiconductor field effect transistors (MOSFETs), with low drain-to-source resistance when said FETs are fully forward-biased.

18. The method of claim 17 wherein said first FET having the drain and source terminals connected to said second end of said first primary winding and zero-volt or ground terminal of said input source respectively, and the gate terminal connected to the output of said controller capable of pulse-width modulation.

19. The method of claim 17 wherein said second FET having the gate and source terminals connected to said first and second ends of said second primary winding respectively, and the drain terminal connected to the high-voltage or positive terminal of said input source; and a resistor being connected across said drain and source terminals for allowing a small amount of current to flow from said input source into said first primary winding at the onset of each conducting cycles of said first FET, with the resultant voltage induced across said second primary winding forward-biasing said second FET to conduct.

20. The method Of claim 13 wherein said first and second switches in said primary circuit are bipolar transistors including Insulated Gate Bipolar Transistors (IGBTs) and bipolar junction transistors (BJTs) with low emitter-collector resistance when said transistors are fully forward-biased.

21. The method of claim 20 wherein said first bipolar transistor having the emitter and collector terminals connected to said second end of said first primary winding and zerovolt or ground terminal of said input source respectively, and the base terminal connected to the output of said controller capable of pulse-width modulation.

22. The method of claim 20 wherein said second bipolar transistor having the base and emitter terminals connected to said first and second ends of said second primary winding respectively, and the collector terminal connected to the high-voltage or positive terminal of said input source; and a resistor being connected across said collector and emitter terminals for allowing a small amount of current to flow from said input emitter into said first primary winding at the onset of each conducting cycles of said first bipolar transistor, with the resultant voltage induced across said second primary winding forward-biasing said second bipolar transistor to conduct.

23. The method of claim 13 wherein said rectifier in said secondary circuit comprising a third and forth diodes having the anodes connected to a first and second ends of said secondary winding respectively, and with their cathodes connected to each other.

24. The method of claim 13 wherein said low pass filter in said secondary circuit comprising an inductor connected in series with a capacitor, and said filter being connected in parallel with said rectifier, and the output voltage being voltage across said capacitor.

* * * * *